United States Patent
Legendre

(10) Patent No.: US 9,478,321 B2
(45) Date of Patent: Oct. 25, 2016

(54) METHOD FOR FILLING WATER INTO A MAIN CIRCUIT OF A NUCLEAR REACTOR, AND CONNECTION DEVICE FOR IMPLEMENTING SAID METHOD

(75) Inventor: Christophe Legendre, Virandeville (FR)

(73) Assignee: Electricite de France, Paris (FR)

( * ) Notice: Subject to any disclaimer, the term of this patent is extended or adjusted under 35 U.S.C. 154(b) by 847 days.

(21) Appl. No.: 13/883,140

(22) PCT Filed: Oct. 31, 2011

(86) PCT No.: PCT/FR2011/052551
§ 371 (c)(1),
(2), (4) Date: May 2, 2013

(87) PCT Pub. No.: WO2012/059682
PCT Pub. Date: May 10, 2012

(65) Prior Publication Data
US 2013/0208845 A1 Aug. 15, 2013

(30) Foreign Application Priority Data
Nov. 4, 2010 (FR) ...................................... 10 59107

(51) Int. Cl.
| G21C 19/00 | (2006.01) |
| G21C 19/28 | (2006.01) |
| G21C 1/09 | (2006.01) |
| G21C 13/02 | (2006.01) |
| G21D 1/02 | (2006.01) |

(52) U.S. Cl.
CPC ................. *G21C 19/28* (2013.01); *G21C 1/09* (2013.01); *G21C 13/022* (2013.01); *G21D 1/02* (2013.01); *Y02E 30/40* (2013.01)

(58) Field of Classification Search
CPC .. G21C 13/022; G21C 13/028; G21C 19/19; G21C 19/20; G21C 19/24; G21C 19/28; G21D 1/04
See application file for complete search history.

(56) References Cited

U.S. PATENT DOCUMENTS

2010/0310032 A1  12/2010 Demerle et al.

FOREIGN PATENT DOCUMENTS

| FR | 2 861 493 A1 | 4/2005 |
| FR | 2 921 510 A1 | 3/2009 |

(Continued)

OTHER PUBLICATIONS

English Translation of Office Action issued for JP 2013-537182 (Jun. 30, 2014).

*Primary Examiner* — Jack W Keith
*Assistant Examiner* — Sharon M Davis
(74) *Attorney, Agent, or Firm* — Drinker Biddle & Reath LLP

(57) ABSTRACT

The method for filling water into and changing the air of a main circuit of a water-cooled nuclear reactor includes a step of placing a connection and fluid isolation device which is connected to a hot leg of each cooling loop of the main circuit so as to substantially insulate, from inside the vessel, the assembly of hot legs. The method also includes a step of injecting water through an injection circuit on at least one hot leg until each cooling loop is filled with water having changed the air from a steam generator and until the water level in the vessel reaches above the side openings of the vessel that correspond to the loops, after which the connecting device is taken out of the vessel. The connecting device is capable of using telescopic connection elements.

13 Claims, 3 Drawing Sheets

(56) References Cited

FOREIGN PATENT DOCUMENTS

| | | |
|---|---|---|
| JP | H08-114698 A | 5/1996 |
| JP | S63-011896 A | 1/1998 |
| WO | 96/01476 A1 | 1/1996 |

METHOD FOR FILLING WATER INTO A MAIN CIRCUIT OF A NUCLEAR REACTOR, AND CONNECTION DEVICE FOR IMPLEMENTING SAID METHOD

CROSS-REFRENCE TO RELATED APPLICATIONS

This application is the U.S. national phase of the International Patent Application No. PCT/FR2011/052551 filed Oct. 31, 2011, which claims the benefit of French Application No. 10 59107 filed Nov. 4, 2010, the entire content of which is incorporated herein by reference.

FIELD

The invention relates to a method for filling with water and emptying air from a primary circuit (also referred to herein as a main circuit) of a water-cooled nuclear reactor, following a shutdown of the reactor, said primary circuit comprising a vessel adapted for being filled with water and for receiving nuclear fuel. The primary circuit additionally comprises at least one cooling loop adapted for drawing water from the vessel, transferring heat to a steam generator, and returning the cooled water to the vessel, each steam generator being connected to a first side opening in the vessel by a first fluid circuit for outflowing water and to a second side opening in the vessel by a second fluid circuit for inflowing water, a pair of said first and second side openings being associated with each cooling loop.

BACKGROUND

A first fluid circuit of a cooling loop is commonly referred to as a "hot leg" because it transports the water drawn from the vessel to the steam generator, and a second fluid circuit is commonly called a "cold leg" because it returns the water cooled by the steam generator back to the vessel. The tubes of a steam generator frequently have an inverted U-shape and are commonly called "hairpins". These tubes are immersed in the water of a closed secondary circuit which circulates in the steam generator, in order to cause this water to boil and supply steam to a turbine driving a generator. By design, steam generators typically contain several hundred hairpins, each formed by a tube about a centimeter in diameter. The tubes are generally located above the level of the vessel and constitute high points which cannot be vented. This portion of the primary circuit therefore requires a special procedure to fill it.

Each of the units of a nuclear power plant must periodically be shut down for maintenance operations and to replenish the nuclear fuel. It is necessary to prevent large air pockets from remaining trapped in the steam generators when refilling. When the reactor is restarted, although the volume of the air pockets greatly decreases due to pressurization of the primary circuit in order to maintain the water in the liquid state by preventing it from boiling, these air pockets circulate through the circuit with the water and excessively large air pockets could damage the primary pumps due to the cavitation phenomenon caused by the passage of a large volume of air through a pump. As a result, and also for chemical reasons, it is necessary to eliminate almost all the air contained in the primary circuit before the unit is restarted.

In order to fill the primary circuit with water so that the volume of trapped air remains below a threshold imposed by safety regulators according to the type of facility, there exist several methods for filling with water and emptying the air from the primary circuit of a nuclear unit after it has been shut down to replenish the fuel. A first method, commonly called "dynamic venting", consists of simply filling the hairpin tubes with water when the pumps of the primary circuit are restarted. The air thus expelled from the hairpins accumulates at the high points of the primary circuit, such as the lid of the vessel, which are then vented. This operation is repeated multiple times, then an air assessment is conducted. This filling and venting method requires numerous pressurizations and depressurizations of the primary circuit, which can be harmful to the mechanical resistance of the vessel in the long term, and also requires starting and stopping the primary pump a significant number of times.

In order to prolong the service life of the power plants, another filling method is used in which the filling is performed after creating a vacuum in the primary circuit, with the nuclear fuel being in place within the vessel. This method has disadvantages, however. In particular, during the depressurization phase and filling phase, the vacuum must be maintained in the primary circuit. If air intake occurs or if a failure occurs in the installation which creates the vacuum, the operations must be restarted. In addition, the preparations for establishing a vacuum are relatively long, typically a hundred hours, several of these hours being on the critical path in the shutdown schedule for the nuclear unit.

The invention aims to overcome the above disadvantages, and in particular it aims to provide a method for filling with water and emptying the air from a primary circuit of a nuclear reactor in preparation for restarting it, which is less costly in terms of management time and which decreases the length of the facility shutdown while complying with nuclear safety rules.

SUMMARY

For this purpose, one object of the invention is a method as defined in the above introduction, characterized by its comprising the steps of:

a) adjusting the water level in the vessel to a first level, at which each cooling loop is vented by at least one of said first and second associated side openings;

b) placing in the vessel a connection and fluid isolation device adapted for connecting to one of said first and second fluid circuits of each cooling loop in order to substantially isolate said fluid circuit relative to the interior of the vessel;

c) injecting water into at least one cooling loop in the one of the first and second fluid circuits of said cooling loop to which the connection and fluid isolation device is connected, at a flow rate intended to fill said cooling loop with water while expelling the air from the steam generator;

d) stopping said water injection when the water flowing into the vessel from each cooling loop has raised the water level to a second level at which all of said first and second side openings of the vessel are completely immersed; and e) removing the fluid connection device.

With these arrangements, filling the primary circuit with water does not require a cycle of pressurization and subsequent depressurization. This increases the service life of the vessel. In addition, turning on the pumps of the primary circuit is unnecessary, which reduces maintenance for these pumps. Among other advantages, one will note that the method generally does not require modifying the existing elements of the facility: only the addition of a connection and fluid isolation device is necessary in order to implement it in a conventional facility. Moreover, the execution of the method requires much less time than the known methods mentioned above. This time could, for example, be reduced to about 12 hours of non-critical preparation plus 2 to 3 hours of setup.

In some preferred embodiments of a method of the invention, one or more of the following arrangements are applied:

the primary circuit comprising a plurality of N cooling loops connected to the vessel, the connection and fluid isolation device put in place in step b) is adapted for connecting to a group of N side openings of the vessel among a first group of N said first side openings and a second group of N said second side openings; which allows having a single connection and fluid isolation device for connecting to the set of first fluid circuits (hot legs) or to the set of second fluid circuits (cold legs);

the connection and fluid isolation device is adapted so that in step c) the water injected into the fluid circuit flows towards at least one other fluid circuit of the same type, passing through the inside of said connection and fluid isolation device; which allows injecting water into a single cooling loop at a hot leg or a cold leg and obtaining the filling of at least one other leg of the same nature (hot or cold) connected to the device, due to the passage of water from the injection leg to said at least one other leg by means of the connection and fluid isolation device;

the injection of water in step c) is performed by a safety injection circuit connected to said fluid circuit and able to inject water in case of water loss in the primary circuit during operation of the nuclear reactor; which allows using an injection circuit already present on the facility and generally comprising a tank of water and a system of injection pumps, thus avoiding costly modifications;

in step b) the connection and fluid isolation device is connected to each said first side opening of the vessel; which substantially isolates each first fluid circuit relative to the interior of the vessel;

in step c) the injection of water into the N cooling loops occurs from a single injection circuit;

a connection and fluid isolation device is used that is adapted for substantially sealing at least one side opening associated with a fluid circuit to which the device is connected;

the water filling method being applied to a primary circuit in which a said steam generator comprises a plurality of tubes for transporting water which each comprise two vertical tube portions connected to each other in a hairpin shape, the injection of water is performed in step c) at a flow rate greater than or equal to a predetermined flow rate sufficient to ensure that in all tubes of each steam generator the water rises in a first of the two vertical tube portions and descends in the second vertical tube portion while expelling air from the tube.

Another object of the invention is a connection and fluid isolation device intended for implementing the above method, characterized by its comprising:

a positioning and guidance system comprising at least two telescoping legs each equipped with a foot adapted for positioning in a fixed manner relative to the vessel;

a central housing supported by the positioning and guidance system and able to be moved with the latter in a substantially vertical direction so as to be lowered into the vessel; and N telescoping connection elements mounted on the central housing such that each can face a corresponding side opening of a group of N side openings of the vessel, each telescoping connection element being deployable for connection to said corresponding side opening.

With these arrangements, once the nuclear fuel and the control rods have been withdrawn from the vessel, the connection and fluid isolation device can be placed above the vessel, precisely positioning the feet of the positioning and guidance system at locations for which the angular positions about the axis of the vessel are predefined, for example using a turntable situated in the upper part of the reactor building, with no need for initial management of the height aspect when positioning the telescoping connection elements.

In preferred embodiments of a connection and fluid isolation device of the invention, one or more of the following arrangements are used:

several telescoping connection elements each comprise an inner channel allowing the passage of fluid between said corresponding side opening and an inside space of the central housing; which allows legs of the same type, for example hot legs, to communicate with each other by means of the connection and fluid isolation device to which these legs are connected;

the connection and fluid isolation device comprises a common actuation mechanism arranged inside said central housing and adapted for actuating together the N telescoping connection elements; which simplifies the structure of the mechanism;

said common actuation mechanism comprises a rotationally controlled hub connected to the N telescoping elements by rods, each rod being hinged on the hub and on a translationally movable component of a telescoping element; which allows a simple and compact structure of the actuating mechanism even when there are more than two telescoping elements;

said hub is rotationally secured to an actuating rod traversing the central housing in a fluid-tight manner, said actuating rod being rotated by a control means supported by the positioning and guidance system; which allows having a control means such as an electric motor with no risk of immersion in the water of the vessel.

BRIEF DESCRIPTION OF THE DRAWINGS

Other features and advantages will be apparent from the following description of some non-limiting example embodiments, with reference to the figures, in which.

DETAILED DESCRIPTION

Figure 1:
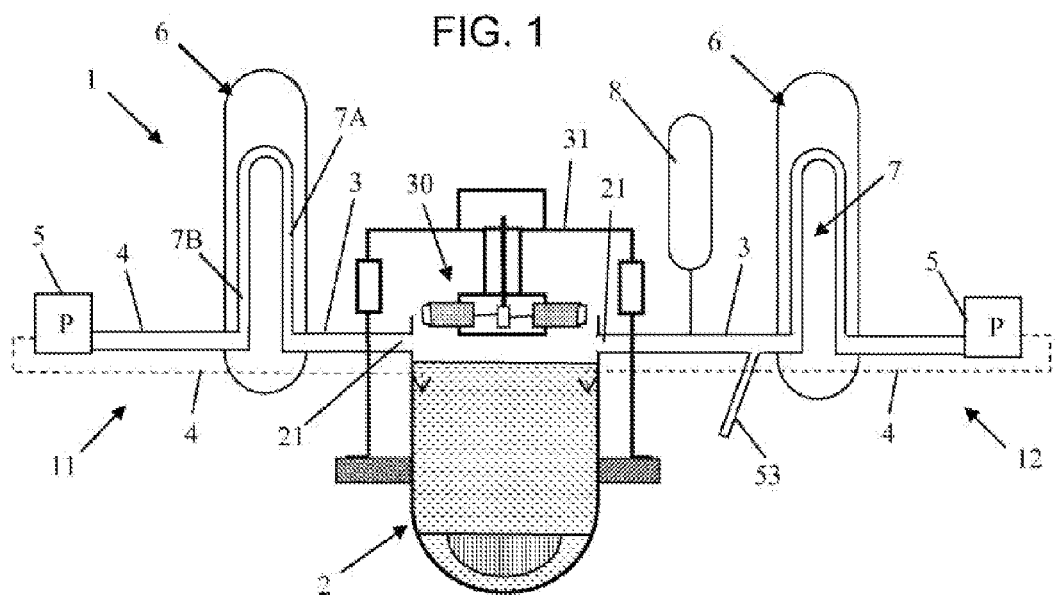
FIG. 1 schematically represents a partial view of a vertical cross-section of a nuclear reactor in which has been installed a connection and fluid isolation device appropriate for implementing the water filling and air emptying method of the invention.

In FIG. 1, a vessel 2 of a nuclear reactor is represented in a cross-sectional view along a plane passing through the vertical axis of the vessel, and two cooling loops 11 and 12 of the primary circuit which are connected to the vessel by side openings in the vessel. Each cooling loop comprises a steam generator 6 connected to a first side opening 21 of the vessel by a first fluid circuit 3 for outflowing water, commonly called a "hot leg", and to a second side opening 22 of the vessel by a second fluid circuit 4 for inflowing water commonly called a "cold leg". Each cold leg comprises a pumping system 5 which circulates the water in the cooling loop from the hot leg to the cold leg.

One of the cooling loops is equipped with a pressurizer 8, which pressurizes the water in the primary circuit during operation, for example to a pressure on the order of 150 bar. When the reactor is in operation, the vessel is closed off by a cover traversed in a fluid-tight manner by movable bars called control rods. The water is therefore kept pressurized in a fluid-tight primary circuit.

The steam generators 6 have the role of transferring the heat from the primary circuit to the secondary circuit (not represented in the figure). They may each be, for example, 20 meters in height, 4 meters in diameter, with a mass of 350 tons. In order to have a very large surface area for the heat exchange, the water of the primary circuit circulates within a bundle of hundreds or even thousands of thin tubes 7 immersed in the secondary fluid circulating within the steam generator housing. The inside diameter of a tube 7 is typically about 1 cm. Each tube 7 comprises two vertical tube portions 7A and 7B connected to each other to form a hairpin, and a bundle of tubes comprises a series of inverted-U tubes of different heights in order to optimize the overall heat exchange surface area, as diagrammed in FIG. 5.

After a reactor shutdown for maintenance and in particular for fuel replenishment, the cover of the vessel and the control rod mechanism, which may weigh more than 100 tons, are removed from the vessel and set down. The water filling and air emptying method of the invention is applied once the cover has been set down and the fuel has been removed from the vessel.

The method of the invention uses a connection and fluid isolation device whose main function consists of substantially isolating from the interior of the vessel the set of legs of the same type, meaning the set of hot legs or the set of cold legs. "Substantially isolating" is understood to mean an isolation which may be complete, so that a fluid circuit, for example a hot leg, is completely prevented from communicating with the interior of the vessel, but also to mean an isolation which may be incomplete, so that a passage for purging air such as a port is created at the end of the fluid circuit at the level of a side opening of the vessel. An example of incomplete isolation is described below in relation to an embodiment in which the connection and fluid isolation device uses telescoping sealing elements in which such air purge passages are arranged.

The following description first details an embodiment in which the device 30 is used to completely isolate the set of hot legs 3 relative to the interior of the vessel. The choice of hot legs is due to the fact that the cold leg inlets to the vessel are generally inaccessible in most pressurized water reactors. In effect, these inlets may be hidden inside the vessel by a shroud assembled within the vessel and which directs the incoming water towards the bottom of the vessel. In addition, it may be preferable for the pumping system 5 if the filling of the steam generator 6 in each cooling loop 11 to 14 occurs in the same flow direction as the pumping during operation.

The description refers to a primary circuit comprising several cooling loops, but the method can also be applied in a facility comprising a single cooling loop, in which case the connection and fluid isolation device is adapted to close off the side opening of the vessel associated with the single hot leg or the single cold leg.

When filling with water, in order to vent effectively from a cooling loop the air expelled from the hairpin tubes 7 of the steam generator 6 of the loop, it is preferable if the leg through which the air is expelled acts as an air vent so that the expelled air is not interfered with by a leg segment filled with water. As a result, the method of the invention comprises a first step of adjusting the water level in the vessel to a first level arranged so that for each cooling loop, at least the side opening associated with the leg through which the air is expelled is exposed to air. As the side openings of the vessel are generally arranged at the same height in most facilities, they will all be exposed to air once the water level in the vessel is adjusted. Said first level is not necessarily precisely predetermined, as variations can be tolerated from one filling operation to another as long as the side openings of the vessel are exposed to air.

In one embodiment of the filling method applied in the reactor represented schematically in FIGS. 1 to 4, the water level 20 in the vessel is brought to a first level arranged so that the openings 22 associated with the cold legs 4 (FIG. 3, FIG. 4) are exposed to air, these openings 22 here being at the same height as the openings 21 associated with the hot legs 3.

Figure 3:
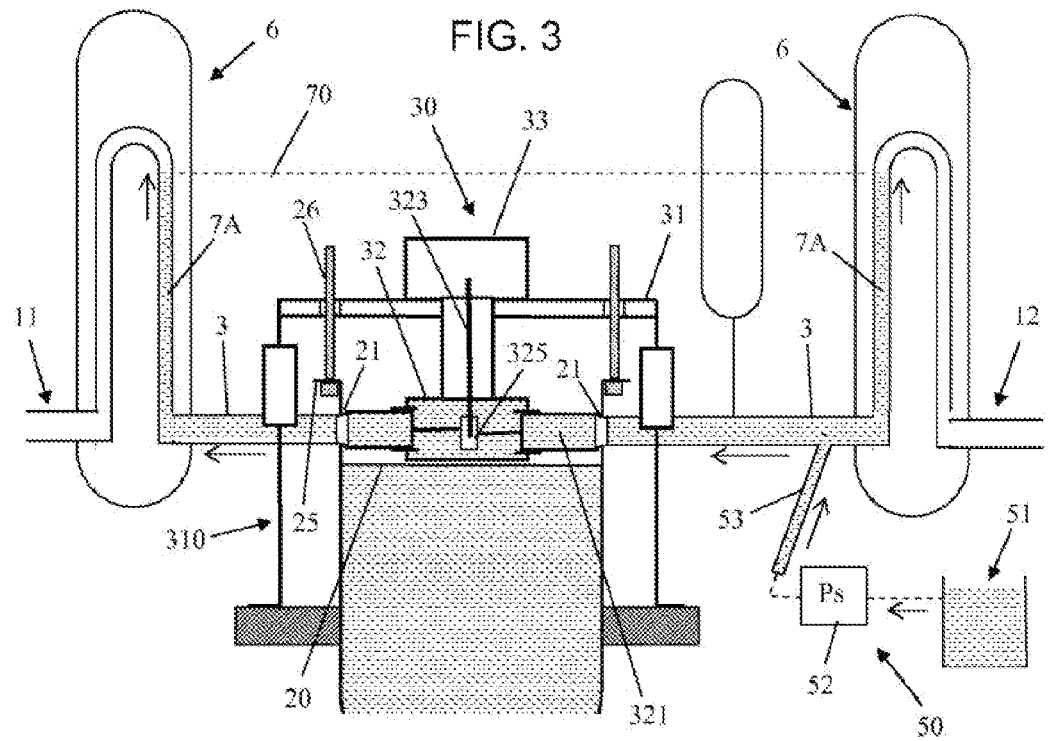
FIG. 3 schematically represents an enlargement of the connection and fluid isolation device in the same connection situation as in FIG. 2, at a later stage in the water filling and air emptying method of the invention in which water is injected into the hot legs using an existing safety injection circuit.

In FIG. 1, the connection and fluid isolation device 30 is positioned relative to the vessel at a precisely defined angular position about the vertical axis of the vessel and at a height which is not yet adjusted. For the angular positioning of the device 30, because the cover of the vessel is removed, one can advantageously use guide columns 26 which are mounted on the vessel and project beyond the mating surface 25 of the vessel (FIG. 3). These columns 26 serve to guide the cover in its placement on the mating surface 25. By construction, the angular positions of the axes of the openings 21 and 22 of the vessel relative to the axes of the columns 26 are precisely known. The device 30 may advantageously be fitted with a positioning and guidance device 31 comprising positioning holes which correspond to the columns 26.

Figure 2:
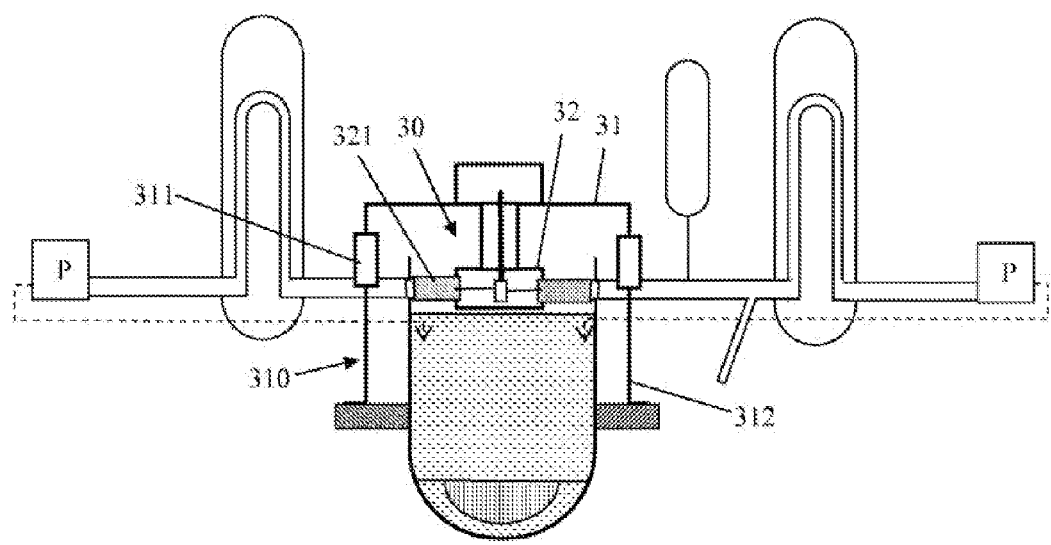
FIG. 2 schematically represents the partial cross-sectional view of the nuclear reactor of FIG. 1, in which the connection and fluid isolation device has been lowered and connected to the hot legs of the primary circuit.

In the present embodiment, the positioning and guidance system 31 comprises at least two telescoping legs 310 adapted for positioning in a fixed manner relative to the vessel 2, and it supports a central housing 32 (FIG. 2). Telescoping connection elements 321 in the same number N as the number of cooling loops in the primary circuit are mounted on the central housing 32. Each telescoping leg 310 is equipped with a foot 312 adapted for placement on a supporting flange 27 solidly attached to the vessel or on a region of the pool of the building housing the vessel, and an actuator 311 for varying the height-wise position of the positioning and guidance system 31 in a substantially vertical direction. This allows vertically moving the central housing 32 in order to lower it into the vessel to a connection-ready position, substantially at the same level as the vessel side openings 21 associated with the hot legs.

The height-wise positioning of the system 31 is managed, for example, with the aid of a set of sensors which use the mating surface 25 of the vessel as the reference in order to precisely position each telescoping connection element 321 at a predetermined vertical distance relative to the mating surface, said distance being arranged so that the telescoping element is in precise axial alignment with the vessel side opening to which it is to be connected. The mating surface of a reactor vessel is generally almost perfectly planar and precisely horizontal. Tolerated planar deviations are, for example, about five tenths of a millimeter for a vessel diameter of four meters. The mating surface therefore constitutes a reliable reference for the height-wise positioning of the set of telescoping elements 321.

In the connection-ready position, the N telescoping connection elements 321 are each facing a corresponding side opening 21 of the vessel and are each able to be deployed for connection to an opening 21.

Figure 6:
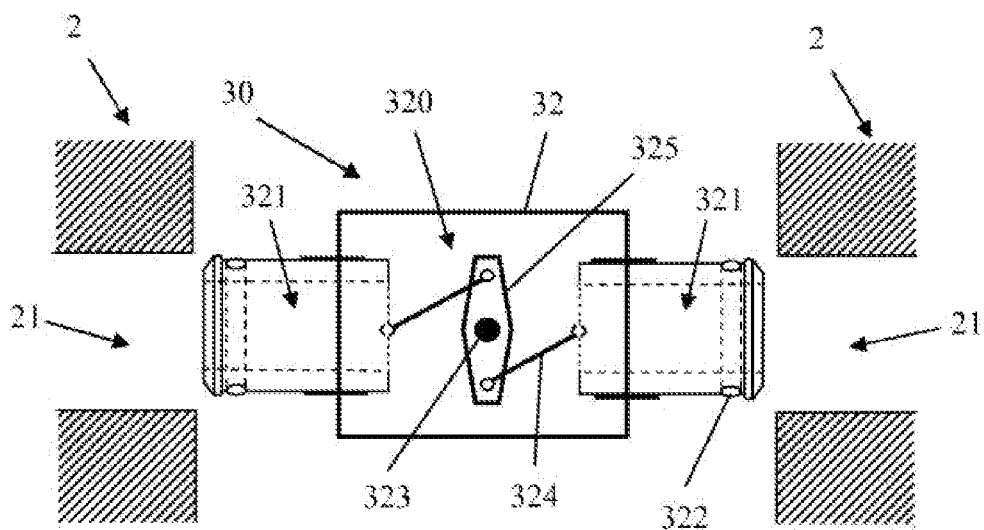
FIG. 6 schematically represents a partial top view of a horizontal cross-section of a connection and fluid isolation device of the invention, equipped with a common actuation mechanism for actuating together the telescoping connection elements.

The connection and fluid isolation device 30 advantageously comprises a common actuating mechanism 320 arranged inside the central housing 32 and adapted for actuating together the N telescoping connection elements 321 (FIG. 6). In the embodiment represented in FIG. 6, the mechanism 320 comprises a rotationally controlled hub 325 connected to the two telescoping elements 321 by rods 324, each rod being hinged on the hub 325 and on a translationally movable component of a telescoping element. In the embodiment diagrammed in FIG. 4, the mechanism also comprises a rotationally controlled hub 325 connected to the four telescoping elements 321 by four hinged rods. Advantageously, the hub 325 can be rotationally connected to an actuating rod 323 traversing the central housing 32 in a fluid-tight manner (FIG. 3). This type of actuating rod 323 is rotationally actuated by a control means 33 such as an electric motor, supported by the positioning and guidance system 31.

Also advantageously, inflatable annular seals 322 may be arranged on the telescoping elements 321 in order to ensure a fluid-tight connection between each element 321 and a side opening 21 of the vessel. The translationally movable component of a telescoping element is then arranged to have an outside diameter that is less than the inside diameter of the side opening 21. As long as the connection device 30 remains in a retracted position as represented in FIG. 6, the inflatable seals 322 are kept deflated. When the connection device 30 is deployed, a frontal portion of each telescoping element 321 is inserted into a side opening 21, leaving a certain amount of radial space. The inflatable seals 322 can then be inflated to establish the seal.

Figure 4:
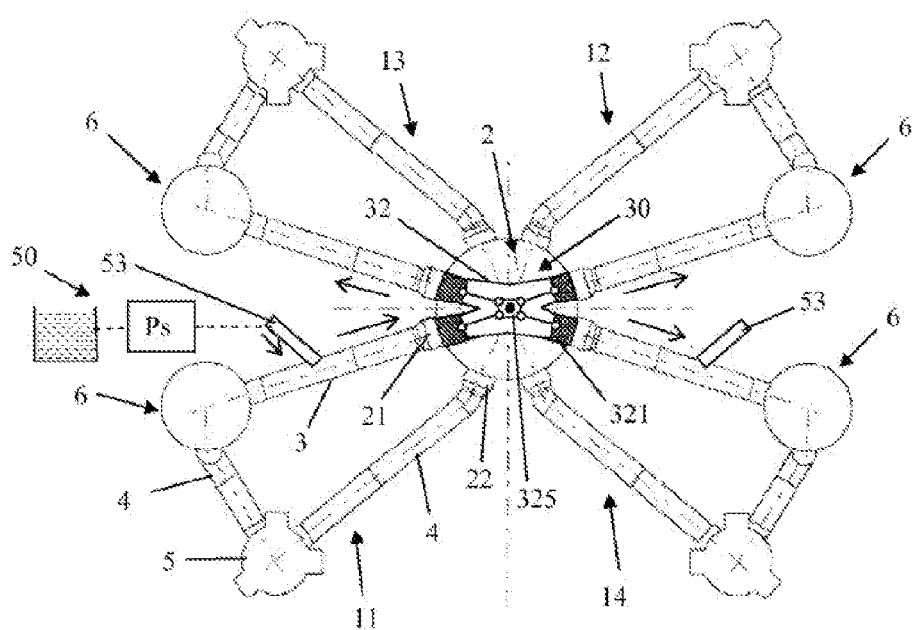
FIG. 4 schematically represents a partial top view of a horizontal cross-section of a nuclear reactor with four cooling loops in which a connection and fluid isolation device of the invention connects the hot legs of the primary circuit to each other, in a step of the method of the invention in which water is injected using one of the safety injection circuits of the facility.

The connected state of the connection and fluid isolation device 30 is represented in FIGS. 2, 3 and 4. In the embodiment represented, each telescoping connection element 321 includes an inside channel which allows fluid to travel between the corresponding side opening 21 and a space inside the central housing 32 of the device 30. In this manner, water can circulate through the device 30 between the legs connected to the device, which here are the hot legs 3.

As the set of hot legs is isolated from the interior of the vessel due to the device 30, the primary circuit can be filled with water by injecting water into the hot legs until the cooling loops are completely filled. The water is injected, for example, using an injection circuit 50 connected to a single hot leg, because the water will progressively fill all the hot legs by passing through the central housing 32 and the telescoping elements 321. In a facility with four cooling loops (FIG. 4), the assembly formed by the housing 32 and the elements 321 resembles an X, and for this reason can be called a "filling cross".

The injection circuit 50 may advantageously use a safety injection system commonly called an SIS, adapted for injecting water in case of water loss in the primary circuit during reactor operation. Most existing facilities include at least one such safety injection system, which generally comprises a tank of water located outside or inside the reactor containment building and low-pressure and high-pressure safety injection pumps.

For the water injection step of the method, low-pressure safety injection pumps are advantageously used as the pumping system 52 to inject water from a safety tank 51 into a hot leg 3, by means of an injection inlet 53 arranged on the hot leg and permanently connected to the pumping system 52 (FIG. 3). In effect, to force the water to rise in the hairpins of the steam generators, the pumps be able to achieve a certain flow rate as explained below. It is understood that the primary circuit is substantially at atmospheric pressure, because the cold legs 4 vent to the air in the vessel.

The injection circuit 50 is not necessarily a safety injection circuit. It is possible, in addition or as an alternative to an SIS system, to use a chemical and volume control system commonly referred to as a CVC and which serves to maintain the necessary amount of water in the primary circuit for cooling the core. A CVC system typically comprises an injection circuit, also called a charging circuit, and a draining circuit, also called a letdown circuit, for regulating the volume of water in the primary circuit. It is possible to use the charging circuit and its pumping system as the injection circuit 50.

The primary circuit can be equipped with several water injection inlets 53 connected to injection pumps, and, depending on the configuration of the facility, more than one injection inlet can be used if this is preferable in order to obtain a sufficient injection rate.

As shown in FIG. 3 and FIG. 4, the water injected into a hot leg 3 passes into the other hot legs through the "filling cross". The level of water 70 then rises in the vertical tube portions 7A of the tubes 7 of the steam generators until it reaches the top of the highest hairpins, then the water descends the vertical tube portions 7B down to the cold legs 4 in order to flow into the vessel 2. The air present in the hairpins 7 is expelled towards the cold legs where it can exit into the vessel by the side openings 22.

Figure 5:
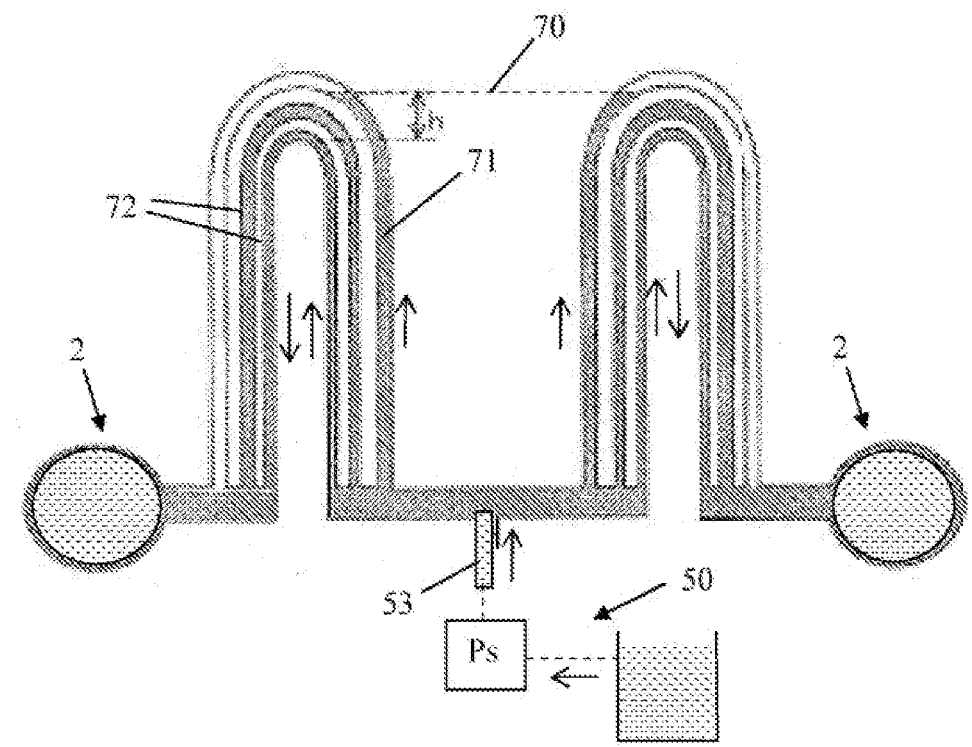
FIG. 5 shows a diagram of the filling of the tubes of steam generators when applying the water filling and air emptying method of the invention, to illustrate the parameters to be taken into account in determining a sufficient flow rate.

One can see from FIG. 5 that filling all the hairpins of the steam generators implies fulfilling certain water flow rate conditions. In effect, in a bundle of inverted-U tubes of different heights, the highest tubes 71 may not fill completely if there is insufficient flow into the hot leg. In such cases, the water will only circulate through a series of other tubes 72 which are not as high, and the level 70 of water in the highest tubes 71 will remain at a relative height h that is insufficient for passing over the tops of the hairpins.

By increasing the injection flow rate, the effective flow rate is increased and therefore the head losses in the lower tubes 72, which facilitates the progressive rise of water in the highest tubes 71. Above a certain injection flow rate, the water reaches the tops of practically all the highest hairpins and descends on the cold leg side while generating a relatively low flow rate in the highest hairpins. The injection flow rate for the water can be increased to augment the various flow rates in a tube bundle, but one must take care not to create too high of an injection flow rate which would generate head losses in the highest hairpins and prevent the water from reaching the tops. For a given tube configuration, the head losses are proportional to the square of the flow rate. For each different facility configuration, one can have a range of injection flow rates, or even an optimal injection flow rate to be respected, which can be determined by experimental tests or mathematical modeling. The number of injection circuits to be used can be determined, based on the range of injection flow rates to be adhered to.

In one embodiment, not represented, there can be a connection and fluid isolation device 30 in which at least one of the N telescoping connection elements 321 is adapted for sealing the side opening of the vessel to which it is connected. This implies having an injection of water into the corresponding cooling loop in order to fill the loop. For example, in an EPR™ reactor having four cooling loops with a separate injection circuit for each hot leg of a loop, it can be arranged so that there is a connection and fluid isolation device 30 comprising four telescoping sealing elements each serving to seal the corresponding side opening of the vessel. The filling with water can then occur by actuating together the pumping systems for the four injection circuits and adjusting the flow rates of the pumps so that the four cooling loops fill at about the same rate. Alternatively, a single pump system having a higher flow rate could be connected to the four injection inlets of the hot legs.

It can also be arranged so there is a connection and fluid isolation device 30 comprising at least one telescoping sealing element, and at least two telescoping non-sealing elements allowing the corresponding hot legs to communicate with each other. This can be advantageous in a configuration where one would use at least two hot leg injection inlets supplied by different pumping systems, so that the pumping system having the highest flow rate feeds at least two hot legs through a single injection inlet and a pumping system having the lowest flow rate feeds a single hot leg.

As mentioned at the start of the present description, the connection and fluid isolation device is not necessarily arranged so as to completely isolate the set of legs of the same type from the interior of the vessel. For example, as a variant of the above embodiment, one can use telescoping substantially sealing elements each equipped with at least one air vent passage such as an orifice through which a small proportion of the water injected into the corresponding leg during the water injection step can directly empty into the vessel without passing through the steam generator. Depending on the configuration of the tubes of the hot legs at their connections to the vessel, such air vent orifices can in effect be useful in preventing air from being trapped in a hot leg in more or less immediate proximity to the telescoping element which is sealing the leg. The situation could in effect become critical if the trapped air does not migrate to the vessel after the connection and fluid isolation device is removed.

An air vent passage could for example be created by arranging a partially annular inflatable seal 322 on a telescoping sealing element, leaving a small air passage between the outer surface of the telescoping element and the inner wall of the hot leg tube facing it. The air vent passage(s) of a telescoping sealing element could be sized so that the flow rate of the water emptied directly into the vessel does not exceed a relatively small proportion of the flow rate of the water injected into the leg during the water injection step, for example several percentage points. This allows maintaining a sufficient flow rate of water in the leg in the direction of the steam generator, while not raising the water level too quickly in the vessel so as to avoid covering the openings associated with the cold legs before the filling of the cold legs has finished.

Moreover, in the embodiments where the connection and fluid isolation device is arranged to allow the hot legs to communicate with each other, at least one air vent orifice can be arranged on the device, for example on the central housing 32, so as to avoid any risk of a volume of turbulent air in the device migrating at a late stage towards a hot leg and remaining trapped in a steam generator at the end of the water injection step.

In another embodiment, not represented, it can be arranged to have a principal or auxiliary injection of water that brings the water directly inside the connection and fluid isolation device 30, for example through a rigid or flexible pipe connected in a fluid-tight manner to the central housing 32 of the device 30, as the water injected by this route will fill the hot legs by passing through the telescoping connection elements 321 when these are designed to allow the passage of fluid.

In the embodiments described above, after the steam generators are filled from the hot legs 3, the water flows into the vessel from each cooling loop and causes the water level to rise until the cold legs 4 are completely filled once the side openings 22 become completely immersed. The hot legs 3, which here are at the same height, are therefore also below the level of the water in the vessel, and the water injection step can then be stopped. Of course, in a configuration where the hot legs are higher than the cold legs, one must wait until the side openings 21 associated with the hot legs are immersed in order to stop the water injection without any risk of air entering the cooling loops. Generally, the water injection is stopped when a second water level is reached in the vessel, at which point the first and second side openings associated with each cooling loop are all completely immersed. One can use the existing water level sensors in the vessel to trigger stopping the water injection.

The fluid connection device 30 can then be raised out of the water and removed from the vessel without allowing any air to enter the loops. The volume of water displaced by the removal of the device 30 can be taken into account in cases where this involves a significant drop in the level in the vessel, in order to allow for a sufficiently high said second predetermined level. In practice, there exists a wide range in water level between the top of the side openings 21 associated with the hot legs and the mating surface of the vessel, for example on the order of a meter. The second level could therefore be placed several centimeters or even several tens of centimeters above the side openings 21.

When the primary circuit is filled with water using the method described above and is air-tight, the water present in the primary circuit and in particular in the steam generators at a greater height than the level in the vessel cannot migrate towards the vessel when the device 30 is removed. The nuclear reactor maintenance operations can then be continued until the reactor is restarted, with no risk of air entering the primary circuit as long as the water in the vessel is kept above the level of the vessel side openings associated with the cooling loops.

The above description refers to a nuclear reactor in which the heat transfer fluid of the primary circuit essentially consists of water. It is understood, however, that the method of the invention is not limited to filling with a specific heat transfer fluid, and can be implemented in facilities using different heat transfer fluids. The term "water" in the present document must be taken in its general sense as indicating any heat transfer fluid in the liquid state.

The invention claimed is:

1. A method for filling with water and emptying air from a primary circuit of a water-cooled nuclear reactor, following a shutdown of the reactor, the primary circuit comprising a vessel configured to be filled with water and to receive nuclear fuel, and additionally comprising at least one cooling loop configured to draw water from the vessel, transfer heat to a steam generator, and return the cooled water to the vessel each steam generator being connected to a first side opening in the vessel by a first fluid circuit for outflowing water and to a second side opening in the vessel by a second fluid circuit for inflowing water, a pair of the first and second side openings being associated with each cooling loop, wherein the method comprises the steps of:
a) adjusting the water level in the vessel to a first level, at which each cooling loop is vented by at least one of the first and second associated side openings;
b) placing in the vessel a connection and fluid isolation device configured to connect to one of the first and second fluid circuits of each cooling loop in order to substantially isolate said one of the first and second fluid circuits relative to the interior of the vessel;
c) injecting water into at least one cooling loop in the one of the first and second fluid circuits of the at least one cooling loop to which the connection and fluid isolation device is connected, at a flow rate intended to fill said cooling loop with water while expelling the air from the steam generator;
d) stopping said water injection when the water flowing into the vessel from each cooling loop has raised the water level to a second level at which all of the first and second side openings of the vessel are completely immersed; and
e) removing the connection and fluid isolation device.

2. The method according to claim 1, applied in a nuclear reactor in which the primary circuit comprises a plurality of N cooling loops connected to the vessel, wherein the connection and fluid isolation device put in place in step b) is configured for connecting to a group of N side openings of the vessel among a first group of N first side openings and a second group of N second side openings.

3. The method according to claim 2, wherein the connection and fluid isolation device is configured so that in step c) the water injected into the fluid circuit flows towards at least one other fluid circuit of the same type, passing through the inside of the connection and fluid isolation device.

4. The method according to claim 2, wherein in step b) the connection and fluid isolation device is connected to each said first side opening of the vessel.

5. The method according to claim 4, wherein in step c) the injection of water into the N cooling loops occurs from a single injection circuit.

6. A connection and fluid isolation device intended for implementing the water filling and air emptying method according to claim 2, comprising:
a positioning and guidance system comprising at least two telescoping legs configured for positioning in a fixed manner relative to a vessel of a nuclear reactor;
a central housing supported by the positioning and guidance system and able to be moved with the latter in a substantially vertical direction so as to be lowered into the vessel; and
N telescoping connection elements mounted on said central housing such that each can face a corresponding side opening of a group of N side openings of the vessel, each telescoping connection element being deployable for connection to said corresponding side opening.

7. The connection and fluid isolation device according to claim 6, wherein several telescoping connection elements each comprise an inner channel allowing the passage of fluid between said corresponding side opening and an inside space of the central housing.

8. The connection and fluid isolation device according to claim 6, wherein it comprises a common actuating mechanism arranged inside said central housing and configured to actuate together the N telescoping connection elements.

9. The connection and fluid isolation device according to claim 8, wherein said common actuation mechanism comprises a rotationally controlled hub connected to the N telescoping connection elements by rods, each rod being hinged on the hub and on a translationally movable component of a telescoping element.

10. The connection and fluid isolation device according to claim 9, wherein said hub is rotationally secured to an actuating rod traversing the central housing in a fluid-tight manner, said actuating rod being rotated by a control means supported by the positioning and guidance system.

11. The method according to claim 1, wherein the injection of water in step c) is performed by a safety injection circuit connected to said fluid circuit and is able to inject water in case of water loss in the primary circuit during operation of the nuclear reactor.

12. The method according to claim 1, wherein a connection and fluid isolation device is used that is configured to substantially seal at least one side opening associated with a fluid circuit to which the device is connected.

13. The method according to claim 1, applied to the primary circuit in which the steam generator comprises a plurality of tubes for transporting water which each comprise two vertical tube portions connected to each other in a hairpin shape, wherein in step c) the injection of water is performed at a flow rate greater than or equal to a predetermined flow rate sufficient to ensure that in all tubes of each steam generator the water rises in a first of the two vertical tube portions and descends in the second vertical tube portion while expelling the air from the tube.

* * * * *